United States Patent [19]

McAllister et al.

[11] Patent Number: 5,034,607
[45] Date of Patent: Jul. 23, 1991

[54] REPRODUCTION OF X-RAY IMAGES WITH PHOTOSTIMULABLE PHOSPHOR

[75] Inventors: William A. McAllister, Convent, N.J.; Lodewijk M. Neyens, Kontich, Belgium; Melvin Tecotzky, Mendham, N.J.

[73] Assignee: Agfa-Gevaert, N.V., Mortsel, Belgium

[21] Appl. No.: 504,601

[22] Filed: Apr. 4, 1990

Related U.S. Application Data

[63] Continuation-in-part of Ser. No. 307,277, Feb. 7, 1989.
[51] Int. Cl.[5] .................. C09K 11/46; G01N 23/04
[52] U.S. Cl. .................. 250/327.2; 250/484.1; 252/301.4 F
[58] Field of Search .......... 250/372.2 A, 327.2 C, 250/484.1 A, 484.1 B, 361 R; 252/301.4 H, 301.4 F

[56] References Cited

U.S. PATENT DOCUMENTS 4,220,551 9/1980 Fouossier et al. ............ 252/301.4 F
4,810,930 3/1989 Verl sdonk et al. ......... 252/301.4 F Primary Examiner—Jack I. Berman
Assistant Examiner—Richard Hanig
Attorney, Agent, or Firm—Breiner & Breiner

[57] ABSTRACT

A method for recording and reproducing an X-ray image comprising the steps of:
(1) causing a photostimulable phosphor in a binder layer to absorb image-wise or pattern-wise modulated X-rays,
(2) photostimulating said phosphor with stimulating electromagnetic radiation selected from visible light and infrared light to relase from the phosphor in accordance with the absorbed X-rays electromagnetic radiation different in wavelength characteristic from the radiation used in the photo-stimulation, and
(3) detecting said light emitted by photostimulation, wherein said phosphor is an alkali earth metal(s) halogermanate or an alkali earth metal(s) halo(silicate-germanate) doped with $Eu^{2+}$ and/or $Ce^{3+}$ and/or thallium, and optionally co-doped with a rare earth metal ion other than $Eu^{2+}$ or $Ce^{3+}$ or with $Na^+$, $K^+$ or $Li^+$ or a mixture of at least two of these co-dopants.

28 Claims, 2 Drawing Sheets

REPRODUCTION OF X-RAY IMAGES WITH PHOTOSTIMULABLE PHOSPHOR

This application is a continuation-in-part application of U.S. pat. application Ser. No. 07/307,277 filed Feb. 7, 1989.

DESCRIPTION

This invention relates to a photostimulable phosphor and to a method of recording and reproducing an X-ray pattern by means of a binder layer containing said phosphor in a screen or panel.

It is well known that X-rays can cause appropriate substances to luminesce. Substances showing the phenomenon of luminescence under the influence of X-rays are called phosphors.

According to a classical method of recording and reproducing an X-ray pattern phosphors are used to form radiographs in conjunction with photographic silver halide emulsion materials being highly sensitive to the emitted fluorescent light.

The phosphors used in said screens should be luminescent but not exhibit appreciable long lived emission after the X-ray source is switched off. If a screen with marked long-lived emission were to he used, it would retain its image after the X-ray beam had ceased and fresh film contacted with it could gain a so-called ghost impression that would interfere with the next image to be made. This phenomenon being undesirable in the production of radiographs by contact exposure with a fluorescent X-ray conversion screen is known under the terms "after-glow" and "lag".

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of visible or infra-red light scans the panel to stimulate the release of stored energy as light that is detected and converted to sequential electrical signals which are processable to produce a visible image. For this purpose, the phosphor should store as much as possible of the incident X-ray energy and emit as little as possible of energy until stimulated by the scanning beam.

In U.S, Pat. No. 4,239,968 photostimulable europium-doped barium fluorohalides are described having the following empirical formula:

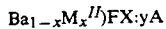

$$Ba_{1-x}M_x^{II}FX:yA$$

wherein:

$M^{II}$ is one or more of Mg, Ca, Sr, Zn and Cd;
X is one or more of Br, Cl or I;
A is at least one member of the group consisting of Eu, Tb, Ce, Tm, Dy, Pr, Ho, Nd, Yb and Er; and
x is in the range $0 \leq x \leq 0.6$ and y is in the range $0 \leq y \leq 0.2$.

These phosphors are particularly useful for application as stimulable phosphors having high sensitivity to stimulating light of a He-Ne laser beam (633 nm). The light emitted on stimulation, called stimulated light, is situated in the wavelength range of 350 to 450 nm with its main peak at 390 nm (ref. the periodical Radiology, September 1983, p. 834).

The stimulable phosphor can be used repeatedly to store X-ray images simply by flooding it with light to erase the residual energy contained.

As can be learned from DE-OS No. 3,347,207 europium-doped barium fluorohalides are chemically not stable and are more particularly sensitive to moisture which according to experiments affects their fluorescence power.

In co-pending U.S. patent application Ser. No. 07/085,787 and corresponding published European patent application No. 0 304 121 photostimulable phosphors have been described that are chemically very stable and not hygroscopic. Said phosphors are halosilicates containing as host metal at least one member selected from the group consisting of Ca, Sr, Ba, Mg, Cd, Zn and Pb, as halogen at least one member selected from the group consisting of Cl, Br and I, and comprising as dopant(s), also called activator(s), $Eu^{2+}$ and/or $Ce^{3+}$ optionally in combination with (a) co-dopant(s) being at least one member selected from the group consisting of La, Y, Sc and the lanthanons.

Said halosilicate phosphors have a definite advantage by their chemical stability and non-hygroscopic character and are particularly sensitive to stimulating light in the 500 to 550 nm hand thus to light emitted by argon-ion laser (514 nm). From practical and commercial viewpoint it is interesting to find photostimulable phosphors that after X-ray irradiation are stimulable with red light (633 nm) emitted by a less expensive He-Ne laser, are resistant to moisture, possess high conversion efficiency and/or a low stimulation energy, in other words offer a high output of light energy for a certain X-ray irradiation dose.

It is an object of the present invention to provide new photostimulable non-hygroscopic phosphors having a very good conversion efficiency of stored X-ray energy into light at lower stimulation energies on photostimulation with light in the wavelength range beyond 600 nm.

It is a further object of the present invention to provide photostimulable phosphors of the group of halogermanates and halo(silicate-germanates) with conversion efficiencies equal or better than that of the halosilicates at much lower stimulation energies.

It is another object of the present invention to provide an X-ray screen or panel containing a said photostimulable phosphor dispersed in s binder layer.

It is still a further object of the present invention to provide a process for recording and reproducing X-ray patterns wherein said phosphors are used for storing energy contained in said X-rays and said energy at high yield is freed again by photostimulation in the form of electronically detectable photons of shorter wavelengths than the light used in the photostimulation.

Other objects and advantages of the present invention will become clear from the following description.

In accordance with the present invention a photostimulable phosphor is provided wherein said phosphor is an alkali earth metal(s) halogermanate or an alkali earth metal(s) halo(silicate-germanate) doped with $Eu^{2+}$ and/or $Ce^{3+}$ and/or thallium and optionally co-doped with a rare earth metal ion other than $Eu^{2+}$ or $Ce^{3+}$ or with $Na^+$, $K^+$ or $Li^+$ or a mixture of at least two of these co-dopants.

According to a preferred embodiment said phoshor is a halogermanate or halo(silicate-germanate) containing as host metal(s) barium and/or strontium optionally in combination with a minor amount of calcium and/or magnesium; as halogen bromine and/or chlorine optionally in combination with iodine and/or fluorine, and as dopant $Eu^{2+}$ and/or $Ce^{3+}$ and/or thallium, optionally in the presence of at least one co-dopant (D) being a rare earth metal ion other than $Eu^{2+}$ or $Ce^{3+}$ or being $Na^+$, $K^+$ or $Li^+$ or a mixture of at least two of these co-dopants.

The terms "germanate" and "silicate-germanate" apply respectively to chemical compounds including anions consisting of germanium and oxygen and anions consisting of silicon and oxygen wherein silicon has been replaced partly (preferably for at least 40 atom %) by germanium.

Preferred phosphors according to the present invention are within the scope of the following empirical formula:

$$Ba_{5-(n+p+q)}Z_qGe_vSi_wO_4X_6:Eu_n^{2+}, D_p^{m+}$$

wherein:
- Z is at least one co-host metal selected from the group consisting of strontium calcium and magnesium,
- q is in the range of 0 to 0.5,
- v is larger than zero and equals at most 1, and $v+w=1$,
- X is bromine and/or chlorine,
- n is in the range of 0.0001 to 0.15,
- p is in the range of 0 to 0.015,
- D is at least one co-dopant selected from the group consisting of $Na^+$, $K^+$, or $Li^+$ and a rare earth metal ion other than $Eu^{2+}$ or $Ce^{3+}$, and m is 1 or 3.

Other preferred phosphors according to the present invention are within the scope of the following empirical formula:

$$Sr_{5-(n+p+q)}Z_qGe_vSi_wO_4X_6:Eu_n^{2+}, D_p^{m+}$$

wherein:
- Z is at least one co-host metal selected from the group consisting of barium, calcium and magnesium,
- q is in the range of 0 to 0.5,
- v is larger than zero and equals at most 1, and $v+w=1$,
- X is bromine and/or chlorine,
- n is in the range of 0.0001 to 0.15,
- p is in the range of 0 to 0.015,
- D is at least one co-dopant selected from the group consisting of $Na^+$, $K^+$, or $Li^+$ and a rare earth metal ion other than $Eu^{2+}$ or $Ce^{3+}$, and m is 1 or 3.

Phosphors according to the present invention that are particularly useful in X-ray image reproduction by photostimulation are within the scope of one of the following empirical formulae (I) to (IV):

$$Ba_{5-(n+p)}Ge_vSi_wO_4X_6:Eu_n^{2+}, D_p^{m+} \quad (I)$$

$$Ba_{5-(n+p)}Ge_vSi_wO_4X_6:Ce_n^{3+}, D_p^{m+} \quad (II)$$

$$Sr_{5-(n+p)}Ge_vSi_wO_4X_6:Eu_n^{2+}, D_p^{m+} \quad (III)$$

$$Sr_{5-(n+p)}Ge_vSi_wO_4X_6:Ce_n^{3+}, D_p^{m+} \quad (IV)$$

wherein:
- v is larger than zero and equals at most 1, and $v+w=1$, preferably v is between 0.4 and 0.9,
- X is bromine and/or chlorine,
- n is in the range of 0.0001 to 0.15,
- p is in the range of 0 to 0.015,
- D is at least one codopant selected from the group consisting of $Na^+$, $K^+$ and a rare earth metal ion other than $Eu^{2+}$ or $Ce^{3+}$, and
- m is 1 or 3.

More preferred photostimulable phosphors according to the present invention are within the scope of one of the following empirical formulae (V) to (VIII):

$$Ba_{5-n}(Ge_vSi_w)O_4X_6:Eu_n^{2+} \quad (V)$$

$$Ba_{5-n}(Ge_vSi_w)O_4X_6:Ce_n^{3+} \quad (VI)$$

$$Sr_{5-n}(Ge_vSi_w)O_4X_6:Eu_n^{2+} \quad (VII)$$

$$Sr_{5-n}(Ge_vSi_w)O_4X_6:Ce_n^{3+} \quad (VIII)$$

wherein n is in the range from 0.0001 to 0.15, v is in the range $0 < v \leq 1$, $v+w$ being equal to 1, and X is bromine and/or chlorine.

The photostimulable phosphors according to the present invention can be prepared by firing at least once the defined alkaline earth compounds yielding upon pyrolysis an oxide in admixture with $GeO_2$ or $GeO_2$ and $SiO_2$ (silica) for periods of up to 40 hours at temperatures between 450° and 1100° C. Instead of mechanically mixing the compounds introducing the dopant(s) and optionally co-dopant(s) with the host metal compound(s), the doping element(s) can be chemically co-precipitated with the host metal compounds in the form of a carbonate or oxalate, which can be decomposed by pyrolysis in an appropriate atmosphere.

For example, in a phosphor preparation the doping with europium as $Eu^{2+}$ is achieved by co-mixing $Eu_2O_3$ with the host metal providing compound(s) or by co-precipitation of $(Ba,Z,Eu)CO_3$, and the doping with cerium is achieved by co-mixing cerium containing compounds, e.g. $CeO_2$ and/or $CeF_3$ and subsequent firing in a reducing atmosphere. Multiple firing stages are normally advantageous with regard to improved conversion efficiency and smaller stimulation energy.

In accordance with the present invention a method for recording and reproducing an X-ray image is provided which method comprises the steps of:
(1) image-wise exposing a photostimulable phosphor to X-rays,
(2) photostimulating said phosphor with stimulating electromagnetic radiation selected from visible light and infrared light to release from said phosphor in accordance with the absorbed X-rays electromagnetic radiation different in wavelength characteristic from the radiation used in the photostimulation, and
(3) detecting the light emitted by the photostimulation applied in step (2), characterized in that the phosphor subjected to the treatments of said steps (1) and (2) is a halogermanate or halo(silicate-germanate) phosphor as defined hereinbefore.

In the method according to the present invention the photostimulable phosphor is used preferably in dispersed state in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl (meth)acrylates, e.g. poly(methyl methacrylate), a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

It is preferable that a minimum amount of binder be employed to obtain a high X-ray energy absorption. However, a very small amount of binding agent may result in a too brittle layer, so a compromise has to be made. The coverage of the phosphor is preferably in the range from about 300 to 1500 g/m2.

According to a preferred embodiment the phosphor layer is used as a supported layer on a support sheet. Suitable support materials are made of a film forming organic resin, e.g. polyethylene terephthalate, but paper supports and cardboard supports optionally coated with a resin layer such as an alpha-olefinic resin layer are also particularly useful. Glass and metal supports can also be used. The thickness of the phosphor layer is preferably in the range of 0.05 to 0.5 mm.

For the preparation of the photostimulable phosphor screen the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

Optionally a light-absorbing layer is provided between the phosphor-containing layer and its support or in the support itself to avoid refection of light at the phosphor-containing layer-support interface and thereby increase the resolution of the photostimulable phosphor screen.

According to an embodiment the photostimulation of the phosphor-binder layer that has been image-wise or pattern-wise exposed with X-rays proceeds with a scanning light beam, preferably a laser light beam, e.g. a beam of a He-Ne or argon ion laser.

The light emitted by photostimulation is detected preferably with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced. For said embodiment and apparatus used therein reference is made e.g. to the periodical Radiology, September 1983, p. 833–838.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to improve the signal-to-noise ratio of the image and enhance the image quality of coarse or fine image features of the radiograph.

On the phosphors of the present invention measurements have been carried out to determine their photophysical properties.

First the emission spectrum which is identical to the "prompt" emission spectrum of the phosphor under X-ray excitation is measured. The measurement proceeds with a spectrofluorimeter in which excitation by X-ray irradiation is carried out with an X-ray source operating at 110 kVp. During continuous X-ray excitation the emitted light is scanned by a monochromator coupled to a photomultiplier. This emission spectrum is identical to that obtained upon photostimulation and is used to determine which filters are to be used in all the other measurements. A first filter transmits the emitted light obtained by photostimulation hut filters out almost all of the stimulating light. For He-Ne laser stimulation, for example, a combination of 2.5 mm HOYA B 410 filter and 2.5 mm HOYA B 440 filters is used, whose transmission spectra are described in HOYA Color FILTER Glass Catalogue No. 8503E published by HOYA Corporation, Tokyo, Japan. For the argon ion laser stimulation a 2.5 mm Schott BG 3 filter or a 5 mm HOYA B390 filter is used whose transmission spectra are described in Farb- und Filterglas Catalogue No. 3531/4d published by SCHOTT GLASWERKE, Mainz, W-Germany and in HOYA Color Filter Glass Catalogue No. 8503E published by HOYA Corporation, Tokyo, Japan respectively.

In the second measurement the total photostimulable energy stored upon exposure to a given X-ray dose is determined. Prior to X-ray excitation any residual energy still present in the phosphor screen is removed by light irradiation. To avoid photoexcitation during erasure a cut-off Schott GG435 filter, which eliminates all wavelengths below 435 nm, is placed between a lamp emitting photostimulating light and the phosphor screen. The phosphor screen is then excited with an X-ray source operating at 85 kVp and 20 mA. For that purpose the MONODOR X-ray source of Siemens AG—W. Germany may be used. The low energy X-rays are filtered out with a 21 mm thick aluminium plate to harden the X-ray spectrum. After X-ray excitation the phosphor screen is transferred in the dark to the measurement set up. In this set up laser light is used to photostimulate the X-ray irradiated phosphor screen. The lasers used in such measurements may be, for example, a He-Ne (633 nm) or argon ion (514 nm) laser.

The laser-optics comprise an electronic shutter, a beam-expander and two filters. A photomultiplier (Hamamatsu R 1398) collects the light emitted by the photostimulation and gives a corresponding electrical current. The measurement procedure is controlled by a Hewlett Packard HP 9826 computer connected to a HP 6944 multiprogrammer. After amplification with a current to voltage converter a TEKTRONIX 7D20 digital oscilloscope visualizes the photocurrent obtained. When the electronic shutter is opened the laser beam begins to stimulate the phosphor screen and the digital oscilloscope is triggered. Using a pinhole placed in contact with the screen an area of only 1.77 mm2 is exposed. Only half of the laser power (5 mW) reaches the screen surface. In this way the intensity of the stimulating beam is more uniform. A red filter (3 mm SCHOTT OG 590) placed immediately in front of the laser eliminates the weak ultraviolet components in the laser emission. The signal amplitude from the photomultiplier is linear with the intensity of the photostimulating light and with the released photostimulable energy. The signal decreases exponentially. When the signal curve is entered the oscilloscope is triggered a second time to measure the offset which is defined as the component of error that is constant and independent of inputs. After subtracting this offset the point at which the signal reaches 1/e of the maximum value is calculated. The integral below the curve is then calculated from the start to this 1/e point. The function is described mathematically by $$f(t) = A \cdot e^{-t/\tau}:$$

wherein A is the amplitude, $\tau$ is the time constant, t is stimulation time, and e is the base number of a natural logarithm.

Half of the stored energy has been released at $t = \tau \ln 2$. To obtain said result, the computer multiplies the integral with the sensitivity of the system. The sensitivity of the photomultiplier and amplifier have therefore to be measured as a function of anode-cathode voltage of the photomultiplier and the convolution of the emission spectrum of the phosphor and the transmission spectrum of the separating filter has to be calculated.

Because the emission light is scattered in all directions only a fraction of the emitted light is detected by the photomultiplier. The positions of the panel and photomultiplier are such that 10% of the total emission is detected by the photomultiplier.

After all these corrections have been made a value for X-ray conversion efficiency is obtained in units of pJ/mm2/mR. This value varies with screen thickness and therefore for measurements to be comparable they have to be carried out at constant phosphor coverage.

The photostimulation energy is defined as the energy necessary to stimulate half the stored energy. The units used are µJ/mm2.

In a third measurement the response time is determined. This is measured by stimulating the phosphor screen with short light pulses. The laser light is modulated with an acousto-optical modulator. The rise time of the stimulating light is 15 ns. The emitted light is measured with a photomultiplier (Hamamatsu R 1398) with a small anode resistor (150 ohm) to obtain a wide bandwidth (10 MHz). The rise-time of the measurement system itself is 35 ns. The response time is the time to reach half of the maximum intensity of the emitted light and is designated $t_{\frac{1}{2}}$.

In a fourth measurement the stimulation spectrum is determined. The light of a tungsten (quartz-iodine) lamp is fed into a monochromator (Bausch and Lomb—W. Germany) and then mechanically chopped with a rotating wheel with a single hole. The lamp provides a continuous spectrum extending from the near UV through the visible spectrum into the infrared. The 33-86-02 grating from Bausch and Lomb is a 1350 line/mm grating covering the visible range from 350 nm to 800 nm in the first order and is blazed at 500 nm. The wavelength of the stimulating light can be set via a step motor connected to the monochromator under the control of a computer. The second harmonic of the monochromator is eliminated by placing a 4 mm Schott GG435 filter in front of the phosphor screen. By chopping the stimulating light (duty cycle 1/200) only a small fraction of the absorbed energy in the phosphor is released. Only the AC signal is measured to eliminate the offset caused by e.g. the dark current of the photomultiplier. A good signal to noise ratio is obtained by averaging several pulses. Upon completing the measurement the computer corrects the curve for the intensity wavelength dependence of the tungsten lamp. The measurement can be repeated so that the evolution of the stimulation spectrum can be followed over a period of up to 15 hours.

The present invention is illustrated by the following examples without limiting it thereto.

EXAMPLE 1

Figure 1:
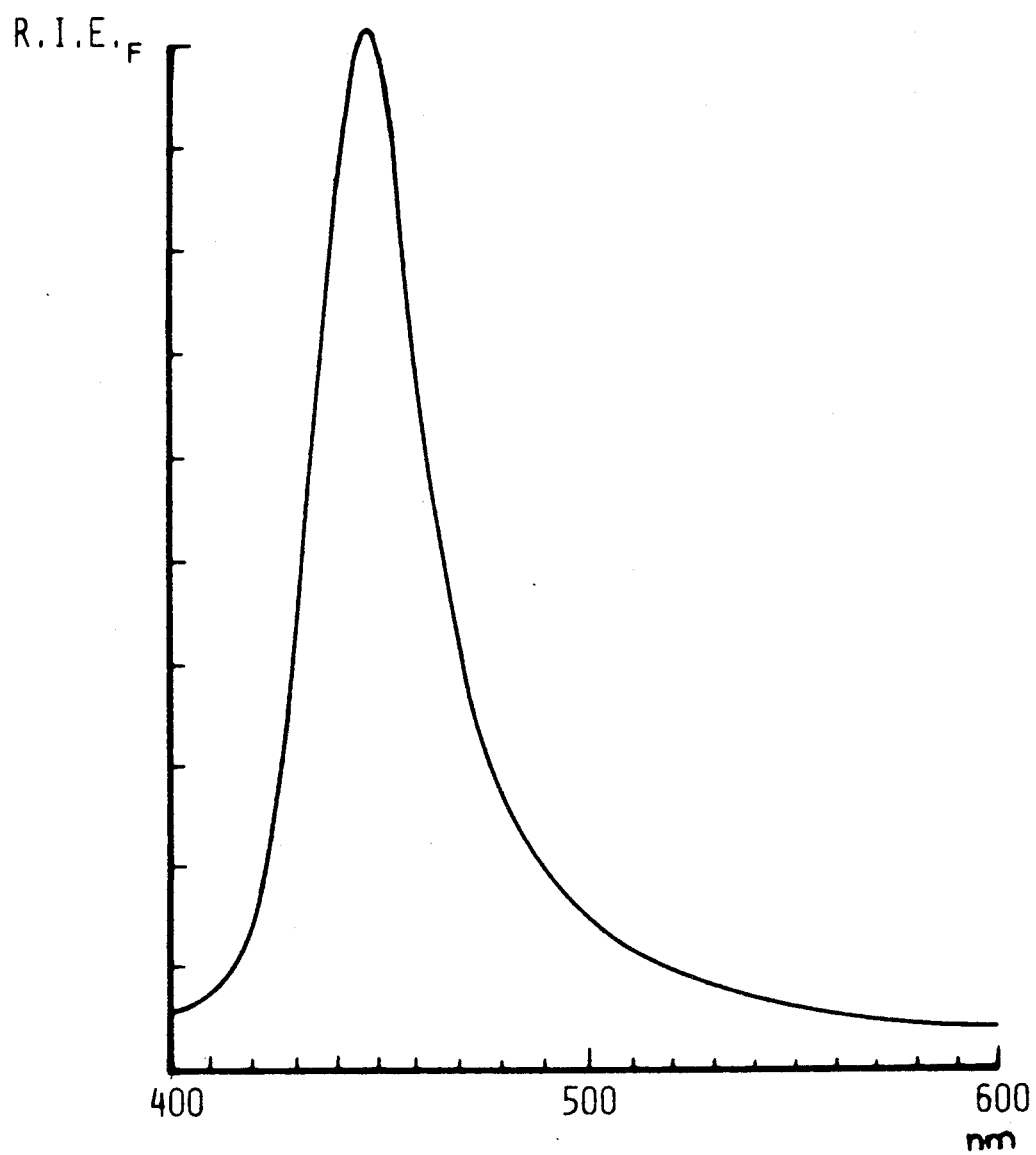
FIG. 1 represent the "prompt" emission spectrum of the phosphor described in Example 4. In the diagram the relative intensity of the fluorescence emission (R.I.E$_f$) is in the ordinate and the wavelength range in nm is in the abscissa.
Figure 2:
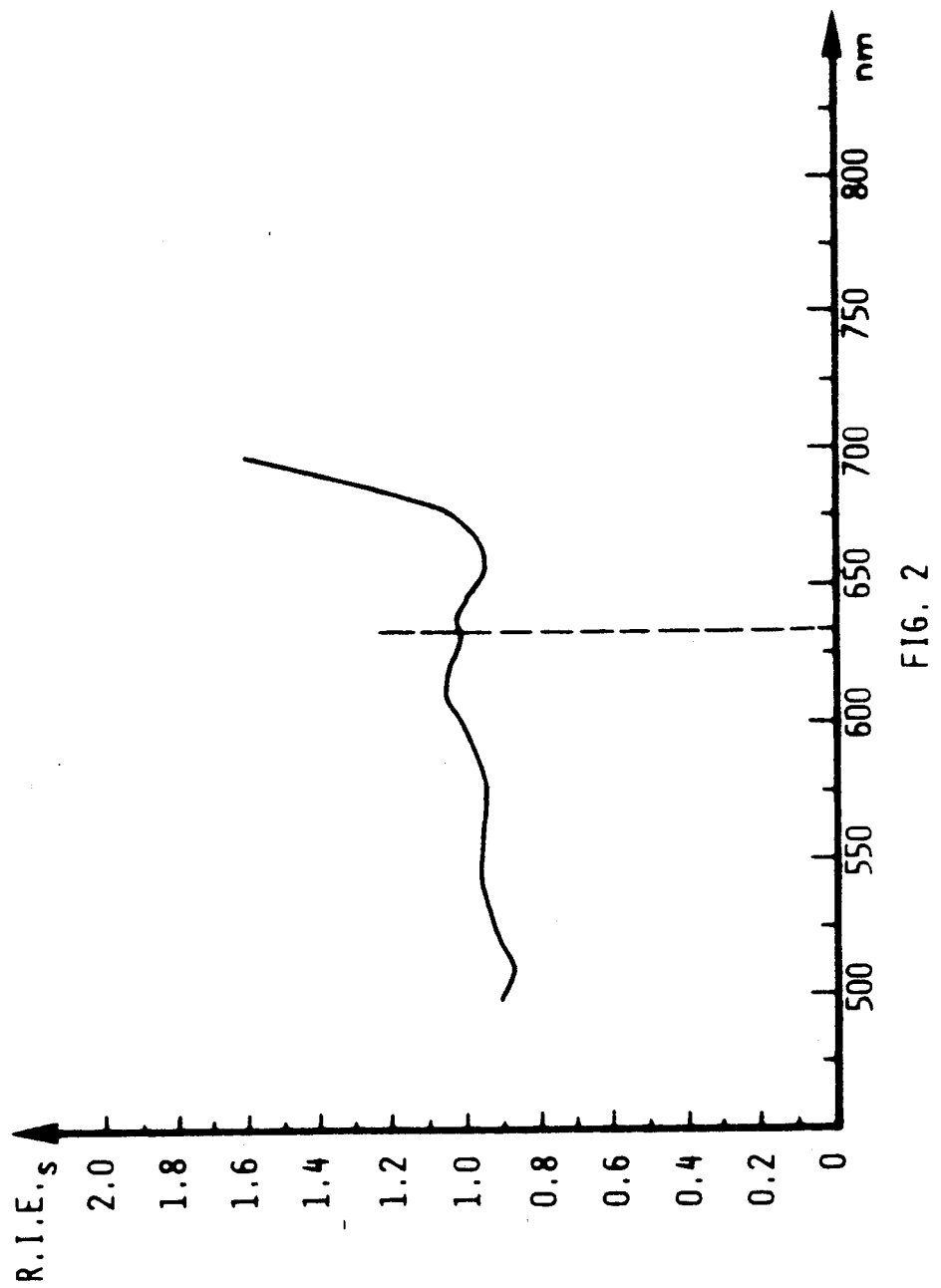
FIG. 2 represents a diagram wherein the relative intensity of the stimulated emission (R.I.E$_s$) at 450 nm peak of the phosphor of Example 4 is in the ordinate and the wavelength range of the stimulating light in nm is in the abscissa.

Comparative Example 0.0025 moles of $Eu_2O_3$ were dissolved in a minimum of concentrated hydrochloric acid and 1.9950 moles of $BaCl_2 \cdot 2H_2O$ added thereto and the mixture was diluted to 2000 ml with doubly distilled water. To the obtained solution were added 1000 ml of 2.2 moles of $(NH_4)_2CO_3$ with stirring. The resulting precipitate was washed for one hour with doubly distilled water, dried several hours at 170° C. and then kept at 400° C. overnight in air in a closed crucible.

Two moles of the dried $(Ba_{0.9975}Eu_{0.0025})CO_3$ were mixed by grinding in a planetary ball mill with 3 moles of $BaBr_2$ and w moles of colloidal silica (containing 9.12% of water) and v moles of $GeO_2$ (containing up to 99.995% of $GeO_2$), wherein $v + w = 1$ mole as indicated in following Table 1, and fired at 775° C. in a nitrogen/hydrogen (95/5 vol %) atmosphere for 1 h. After cooling down the obtained sample was hand-ground and refired for 2 h under the same conditions as defined above yielding $Ba_{5-n}Ge_vSi_wO_4Br_6:Eu_n^{2+}$, wherein $v + w = 1$ and $Eu^{2+}$ is 0.005 (n = 0.005).

The ground powder was then dispersed in a binder solution containing cellulose acetobutyrate dissolved in methyl ethyl ketone. The dispersion obtained was coated onto a 100 µm thick transparent sheet of polyethylene terephthalate to give a coating weight of 500 g/m2. This screen was then used to determine the energy storage characteristics of the phosphor. After erasing any residual stored energy by irradiating with white light filtered to remove the UV-components, the screen was irradiated with a given dose of X-rays and then stimulated with He-Ne laser light (633 nm) as described hereinbefore. The light obtained by photostimulation was filtered to remove the residual stimulating light without attenuating the emitted light and detected with a photomultiplier.

The conversion efficiency (C.E.) expressed in pJ/mm2/mR and a stimulation (S.E.) expressed as μJ/mm2 are listed in the following Table 1.

TABLE 1

| $Eu^{2+}$ (n = 0.005) | Concentration (mole) | | C.E. (pJ/mm2/mR) | S.E. (μJ/mm2) |
|---|---|---|---|---|
| | w SiO$_2$ | v GeO$_2$ | | |
| | 1.0 | 0 | 0.5 | 91 |
| | 0.8 | 0.2 | 0.9 | 88 |
| | 0.5 | 0.5 | 0.8 | 57 |
| | 0.2 | 0.8 | 1.1 | 50 |

EXAMPLE 2

Comparative Example

Example 1 was repeated with the difference however, that in the phosphor preparation 1.99 moles of BaCl$_2$.2H$_2$O and 0.005 moles of Eu$_2$O$_3$ were used to produce a phosphor with a 0.01 Eu$^{2+}$ concentration. The conversion efficiency and stimulation energy results are listed in the following Table 2.

TABLE 2

| $Eu^{2+}$ (n = 0.01) | Concentration (mole) | | C.E. (pJ/mm2/mR) | S.E. (μJ/mm2) |
|---|---|---|---|---|
| | w SiO$_2$ | v GeO$_2$ | | |
| | 1.0 | 0 | 0.6 | 92 |
| | 0.8 | 0.2 | 1.5 | 83 |
| | 0.5 | 0.5 | 1.4 | 61 |
| | 0.2 | 0.8 | 1.3 | 49 |

EXAMPLE 3

Comparative Example

Example 1 was repeated with the difference however, that in the phosphor preparation 1.985 moles of BaCl$_2$.2H$_2$O and 0.0075 moles of Eu$_2$O$_3$ were used to produce a phosphor with a 0.015 Eu$^{2+}$ concentration. The conversion efficiency and stimulation energy results are listed in the following Table 3.

TABLE 3

| $Eu^{2+}$ (n = 0.015) | Concentration (mole) | | C.E. (pJ/mm2/mR) | S.E. (μJ/mm2) |
|---|---|---|---|---|
| | w SiO$_2$ | v GeO$_2$ | | |
| | 1.0 | 0 | 0.7 | 81 |
| | 0.8 | 0.2 | 1.6 | 53 |
| | 0.5 | 0.5 | 0.7 | 40 |
| | 0.2 | 0.8 | 1.0 | 39 |

EXAMPLE 4

Comparative Example

Example 1 was repeated with the difference however, that in the phosphor preparation 1.97 moles of BaCl$_2$.2H$_2$O and 0.015 moles of Eu$_2$O$_3$ were used in an amount to produce a phosphor with a 0.03 Eu$^{2+}$ concentration. The conversion efficiency and stimulation energy results are listed in the following Table 4.

TABLE 4

| $Eu^{2+}$ (n = 0.03) | Concentration (mole) | | C.E. (pJ/mm2/mR) | S.E. (μJ/mm2) |
|---|---|---|---|---|
| | w SiO$_2$ | v GeO$_2$ | | |
| | 1.0 | 0 | 1.1 | 76 |
| | 0.8 | 0.2 | 1.7 | 58 |
| | 0.5 | 0.5 | 1.8 | 42 |
| | 0.2 | 0.8 | 2.0 | 38 |

EXAMPLE 5

Comparative Example

Example 1 was repeated with the difference however, that in the phosphor preparation 1.96 moles of BaCl$_2$.2H$_2$O and 0.02 moles of Eu$_2$O$_3$ were used to produce a phosphor with a 0.04 Eu$^{2+}$ concentration. The conversion efficiency and stimulation energy results are listed in the following Table 5.

TABLE 5

| $Eu^{2+}$ (n = 0.04) | Concentration (mole) | | C.E. (pJ/mm2/mR) | S.E. (μJ/mm2) |
|---|---|---|---|---|
| | w SiO$_2$ | v GeO$_2$ | | |
| | 1.0 | 0 | 2.8 | 80 |
| | 0.8 | 0.2 | 2.7 | 88 |
| | 0.5 | 0.5 | 3.2 | 65 |
| | 0.2 | 0.8 | 2.8 | 45 |

EXAMPLE 6

The preparation of differently Eu$^{2+}$ doped phosphors proceeded by using 0.0198 moles of Ba$_{1-n}$Eu$_n$CO$_3$ (n being as defined hereinafter), 0.0325 mole of BaBr$_2$ (anhydrous) and 0.01046 mole of GeO$_2$ (containing up to 99.995 wt. % of GeO$_2$).

The phosphor ingredients were mixed by grinding for 15 min in a planetary ball mill and fired in alumina crucibles at 800° C. for 2 h in a nitrogen/hydrogen (95/5 vol. %) atmosphere. After cooling down the obtained samples were hand-ground and refired for 2 h at 800° C. in the same atmosphere.

The Ba$_{5-n}$GeO$_4$Br$_6$:Eu$^{2+}$$_n$ phosphors thus formed had Eu$^{2+}$ concentrations corresponding with n=0.00095; 0.0047; 0.0094; 0.0142; 0.0189 and 0.0284 respectively.

The X-ray conversion efficiency (C.E.) results expressed in pJ/mm2/mR and stimulation energy (S.E.) results expressed in μJ/mm2 are listed in the following Table 6.

TABLE 6

| Eu$^{2+}$ "n" | C.E. (pJ/mm2/mR) | S.E. (μJ/mm2) |
|---|---|---|
| 0.00095 | 1.25 | 35.9 |
| 0.0047 | 1.46 | 35.3 |
| 0.0094 | 1.10 | 34.0 |
| 0.0142 | 1.01 | 29.6 |
| 0.0189 | 1.18 | 35.2 |
| 0.0284 | 1.02 | 32.4 |

EXAMPLE 7

Comparative Example

Phosphor preparation proceeded by using 3.90950 q of Ba$_{0.9925}$Eu$_{0.0075}$CO$_3$ and 9.80094 g of BaBr$_2$ (anhydrous) with the addition of an appropriate quantity "v" of GeO$_2$ (containing up to 99.995 wt. % of GeO$_2$) and of SiO$_2$ "w" (containing 0.1 wt. % of H$_2$O), so that v+w=1.

The phosphor ingredients were mixed by grinding for 15 min in a planetary ball mill and fired in quartz crucibles at 800° C. for 2 h in a nitrogen/hydrogen (95/5 vol.

%) atmosphere. After cooling down the obtained sample was hand-ground and refired for 2 h at 800° C. in the same atmosphere.

The $Ba_{5-n}Ge_vSi_wO_4Br_6:Eu^{2+}{}_n$ phosphors thus formed, wherein $v+w=1$, had an X-ray conversion efficiency (C.E.) expressed in pJ/mm2/mR and stimulation energy (S.E.) (for stimulation with 633 nm laser light) expressed in μJ/mm2 as listed in the following Table 7.

TABLE 7

| v | w | C.E. (pJ/mm2/mR) | S.E. (μJ/mm2) |
|---|---|---|---|
| 1 | 0.0 | 0.40 | 39.2 |
| 0.9 | 0.1 | 0.66 | 27.2 |
| 0.8 | 0.2 | 1.45 | 30.2 |
| 0.7 | 0.3 | 1.79 | 34.5 |
| 0.6 | 0.4 | 1.88 | 37.9 |
| 0.5 | 0.5 | 2.77 | 39.2 |
| 0.4 | 0.6 | 1.91 | 40.5 |
| 0.3 | 0.7 | 2.27 | 44.8 |
| 0.2 | 0.8 | 2.31 | 52.6 |
| 0.1 | 0.9 | 2.49 | 56.5 |
| 0.0 | 1.0 | 1.89 | 67.9 |

EXAMPLE 8

Phosphor preparation proceeded by using 7.89942 g of $Ba_{0.99}Eu_{0.01}CO_3$, 18.09404 g BaBr2 (anhydrous), 0.2496 g of SiO2 (containing 4 wt. % of H2O), 1.67344 g of GeO2 (containing up to 99.995 wt. % of GeO2) so that $v+w=1$. Thereto an amount of 0.024 g of KBr was added. For comparative test purposes a same sample but without KBr was prepared.

The phosphor ingredients were mixed by grinding for 15 min in a planetary ball mill and fired in a tube furnace for 2 h at 775° C. in a nitrogen/hydrogen (95/5 vol. %) atmosphere. After cooling down the obtained samples were hand-ground and refired for 2 h at 775° C. under the same atmospheric conditions as defined above.

The X-ray conversion efficiency (C.E.) expressed in pJ/mm2/mR and stimulation energy (S.E.) (for stimulation with 633 nm laser light) expressed in μJ/mm2 for the sample with KBr addition and sample without such are given hereinafter in the following Table 8.

TABLE 8

| KBr | C.E. (pJ/mm2/mR) | S.E. (μJ/mm2) |
|---|---|---|
| present | 5.43 | 41.4 |
| absent | 1.02 | 22.1 |

EXAMPLE 9

Comparative Example

Phosphor preparation proceeded by using 3.8844 g of BaCO3, 9.80094 g of BaBr2 (anhydrous), 0.01935 g of CeO2 or 0.02217 g of CeF3 as dopant introducing substance (D.I.S.) with the addition of appropriate quantities "v" of GeO2 (containing up to 99.995 wt. % of GeO2) and "w" of SiO2 (water content 1 wt. %) so that $v+w=1$. For comparative test purposes in two of the phosphor samples mentioned in following Table 9 $w=1$ and $v=0$.

The phosphor ingredients were mixed by grinding for 15 min in a planetary ball mill and fired in alumina crucibles for 2 h at 800° C. in a nitrogen/hydrogen (95/5 vol. %) atmosphere. After cooling down the obtained samples were hand-ground and refired for 2 h at 800° C. in the same atmosphere as defined hereinbefore.

The $Ba_{5-n}(Ge_vSi_w)O_4Br_6:Ce^{3+}{}_n$ phosphors thus formed, wherein $v+w=1$, had an X-ray conversion efficiency (C.E.) expressed in pJ/mm2/mR and stimulation energy (S.E.) expressed in μj/mm2 (for stimulation with 633 nm laser light) as listed hereinafter in the following Table 9.

TABLE 9

| Phosphor | D.I.S. | C.E. (pJ/mm2/mR) | S.E. (μJ/mm2) |
|---|---|---|---|
| $Ba_{5-n}Ce_nSiO_4Br_6$ | (CeO2) | 0.023 | 233 |
| " | (CeF3) | 0.029 | 147 |
| $Ba_{5-n}Ce_nSi_{0.4}Ge_{0.6}O_4Br_6$ | (CeO2) | 0.014 | 36 |
| " | (CeF3) | 0.011 | 30 |

EXAMPLE 10

Phosphor preparation proceeded by using 0.01925 mole of BaCO3, 0.00075 mole of TlCl, 0.004 mole of colloidal SiO2, 0.006 mole of GeO2 and 0.03 mole of BaBr2.

The phosphor ingredients were mixed by grinding for 15 min in a planetary ball mill and fired in alumina crucible for 2 h at 450° C. followed by a 2 h firing at 800° C. in a nitrogen/hydrogen (95/5 vol. %) atmosphere. After cooling down the obtained sample was hand-ground and refired for 2 h at 800° C. in the same atmosphere as defined hereinbefore.

The $Ba_{5-n}Si_{0.4}Ge_{0.6}O_4Br_6:Tl^+{}_n$ phosphor thus formed, wherein $n=0.075$, had an X-ray conversion efficiency (C.E.) of 0.04 pJ/mm2/mR and stimulation energy (S.E.) of 56.4 μJ/mm2 (for stimulation with 633 nm laser light).

EXAMPLE 11

Phosphor preparation proceeded by using 0.0199 mole of $(Ba_{0.99925},Eu_{0.00075})CO_3$, 0.0001 mole of TlCl, 0.004 mole of colloidal SiO2, 0.006 mole of GeO2 and 0.03 mole of BaBr2.

The phosphor ingredients were mixed by grinding for 15 min in a planetary hall mill and fired in alumina crucible for 2 h at 450° C. followed by a 2 h firing at 800° C. in a nitrogen/hydrogen (95/5 vol. %) atmosphere. After cooling down the obtained sample was hand-ground and refired for 2 h at 800° C. in the same atmosphere as defined hereinbefore.

The $Ba_{5-(n+p)}Si_{0.4}Ge_{0.6}O_4Br_6:Eu^{2+}{}_n, D^{m+}{}_p$ phosphor thus formed, wherein $n=0.0015$, $D=$thallium, $m=1$ and $p=0.01$, had an X-ray conversion efficiency (C.E.) of 2.5 pJ/mm2/mR and stimulation energy (S.E.) of 37.9 μJ/mm2 (for stimulation with 633 nm laser light).

EXAMPLE 12

Phosphor preparation proceeded by using 0.0398 mole of $(Ba_{0.99},Eu_{0.01})CO_3$, 0.008 mole of colloidal SiO2, 0.012 mole of GeO2 and 0.06 mole of BaBr2. In addition a small amount of co-dopant was added (see Table 10). The concentration of the co-dopant was taken half the europium concentration.

The phosphor ingredients were mixed by grinding for 15 min in a planetary ball mill and fired in alumina crucible for 2 h at 450° C. in a nitrogen/hydrogen (95/5 vol. %) atmosphere. The samples were hand-ground and refired for 2 h at 775° C. in the above mentioned atmosphere. After cooling down the obtained samples were hand-ground again and refired for 2 h at 775° C. in the same atmosphere.

The $Ba_{5-(n+p)}Si_{0.4}Ge_{0.6}O_4Br_6:Eu^{2+}{}_n, D^{m+}{}_p$ phosphors thus formed, wherein n=0.02, D=(see Table 10), m=(see Table 10) and p=0.01, had an X-ray conversion efficiency (C.E.) expressed in pJ/mm2/mR and stimulation energy (S.E.) expressed in μJ/mm2 (for stimulation with 633 nm laser light) as listed in Table 10.

TABLE 10

| D  | m | C.E. (pJ/mm2/mR) | S.E. (μJ/mm2) |
|----|---|------------------|---------------|
| Lu | 3 | 2.67             | 36.2          |
| La | 3 | 0.61             | 38.0          |
| Gd | 3 | 1.18             | 29.1          |
| Y  | 3 | 2.99             | 36.9          |
| Na | 1 | 1.58             | 35.1          |

EXAMPLE 13

0.0125 mole of $Eu_2O_3$ and 0.975 mole of $SrCO_3$ were dissolved in nitric acid and diluted to 1000 ml with doubly distilled water. To the obtained solution 1 liter of a 1.1 molar $(NH_4)_2C_2O_4$ solution was added dropwise with stirring.

The resulting precipitate was washed with doubly distilled water up to neutral and dried for 15 h at 150° C.

0.2 mole of the dried $(Sr_{0.975},Eu_{0.025})C_2O_4$ were mixed by grinding in a planetary ball mill with 0.06 mole of colloidal $SiO_2$ (containing 1.9% wt of water) and 0.04 mole of $GeO_2$ (containing up to 99.995% wt of $GeO_2$) and 0.3 mole of $SrCl_2.6H_2O$ (for sample A) or 0.25 mole of $SrCl_2.6H_2O$ and 0.05 mole of $SrBr_2.6H_2O$ (for sample B).

These mixtures were fired at 450° C. for 2 h followed by a 2 h firing at 810° C. in a 100 % nitrogen atmosphere. After cooling down the obtained samples were hand-ground and refired for 2 h at 810° C. in air atmosphere. Once again the samples were hand-ground and refired for 2 h at 810° C. in a nitrogen/hydrogen (95/5 vol. %) atmosphere.

The phosphor sample 1 with empirical formula: $Sr_{5-n}(Si_{0.6}Ge_{0.4})O_4Cl_6:Eu^{2+}{}_n$ (n=0.05) and the phosphor sample 2 with empirical formula: $Sr_{5-n}(Si_{0.6}Ge_{0.4})O_4Cl_5Br:Eu^{2+}{}_n$ (n=0.05) had an X-ray conversion efficiency (C.E.) expressed in pJ/mm2/mR and stimulation energy (S.E.) expressed in μJ/mm2 (for stimulation with 633 nm laser light) as in Table 11.

TABLE 11

| Sample | C.E. (pJ/mm2/mR) | S.E. (μJ/mm2) |
|--------|------------------|---------------|
| 1      | 0.97             | 1110          |
| 2      | 3.36             | 446           |

EXAMPLE 14

Phosphor preparation proceeded by using 0.02 mole of $(Ba_{0.99925},Eu_{0.00075})CO_3$, 0.004 mole of colloidal $SiO_2$, 0.006 mole of $GeO_2$, 0.0025 mole of $CaBr_2$ and 0.0275 mole of $BaBr_2$.

The phosphor ingredients were mixed by grinding for 15 min in a planetary ball mill and fired in alumina crucible for 2 h at 450° C. followed by a 2 h firing at 800° C. in a nitrogen/hydrogen (95/5 vol. %) atmosphere. After cooling down the obtained sample was hand-ground and refired for 2 h at 800° C. in the same atmosphere.

The $Ba_{5-(n+q)}Z_qSi_{0.4}Ge_{0.6}O_4Br_6:Eu^{2+}{}_n$ phosphor thus formed, wherein n=0.0015, Z=Ca and q=0.25, had an X-ray conversion efficiency (C.E.) of 1.7 pJ/mm2/mR and stimulation energy (S.E.) of 39.8 μJ/mm2 (for stimulation with 633 nm laser light).

EXAMPLE 15

Phosphor preparation proceeded by using 0.02 mole of $(Ba_{0.99925},Eu_{0.00075})CO_3$, 0.004 mole of colloidal $SiO_2$, 0.006 mole of $GeO_2$, 0.0025 mole of $MgBr_2$ and 0.0275 mole of $BaBr_2$.

The phosphor ingredients were mixed by grinding for 15 min in a planetary ball mill and fired in alumina crucible for 2 h at 450° C. followed by a 2 h firing at 800° C. in a nitrogen/hydrogen (95/5 vol. %) atmosphere. After cooling down the obtained sample was hand-ground and refired for 2 h at 800° C. in the same atmosphere.

The $Ba_{5-(n+q)}Z_qSi_{0.4}Ge_{0.6}O_4Br_6:Eu^{2+}{}_n$ phosphor thus formed, wherein n=0.0015, Z=Mg and q=0.25, had an X-ray conversion efficiency (C.E.) of 0.27 pJ/mm2/mR and stimulation energy (S.E.) of 43.2 μJ/mm2 (for stimulation with 633 nm laser light).

EXAMPLE 16

Phosphor preparation proceeded by using 0.01647 mole of $BaCO_3$, 0.000075 mole of $Eu_2O_3$, 0.0309 mole of $BaBr_2$, 0.004 mole of colloidal $SiO_2$, 0.006 mole of $GeO_2$ and 0.0025 mole of ZnO.

The phosphor ingredients were mixed by grinding for 15 min in a planetary ball mill and fired in alumina crucible for 2 h at 450° C. followed by a 2 h firing at 750° C. in a nitrogen/hydrogen (95/5 vol. %) atmosphere. After cooling down the obtained sample was hand-ground and refired for 2 h at 750° C. in nitrogen atmosphere.

The phosphor thus formed had an X-ray conversion efficiency (C.E.) of 0.04 pJ/mm2/mR and stimulation energy (S.E.) of 81.5 μJ/mm2 (for stimulation with 633 nm laser light).

EXAMPLE 17

Phosphor preparation proceeded by using 0.02 mole of $(Ba_{0.99925}, Eu_{0.00075})CO_3$, 0.004 mole of colloidal $SiO_2$, 0.006 mole of $GeO_2$, 0.0025 mole of $SrBr_2$ and 0.0275 mole of $BaBr_2$.

The phosphor ingredients were mixed by grinding for 15 min in a planetary ball mill and fired in alumina crucible for 2 h at 450° C. followed by a 2 h firing at 800° C. in a nitrogen/hydrogen (95/5 vol. %) atmosphere. After cooling down the obtained sample was hand-ground and refired for 2 h at 800° C. in the same atmosphere.

The $Ba_{5-(n+q)}Z_qSi_{0.4}Ge_{0.6}O_4Br_6:Eu^{2+}{}_n$ phosphor thus formed, wherein n=0.0015, Z=Sr and q=0.25, had an X-ray conversion efficiency (C.E) of 5.35 pJ/mm2/mR and stimulation energy (S.E.) of 44.4 μJ/mm2 (for stimulation with 633 nm laser light).

EXAMPLE 18

Phosphor preparation proceeded by using 0.02 mole of $(Ba_{0.99925},Eu_{0.00075})CO_3$, 0.004 mole of colloidal $SiO_2$, 0.006 mole of $GeO_2$, and 0.03 mole of a mixture of $BaBr_2$ and $SrBr_2.6H_2O$ with variable strontium bromide content as can be learned from Table 12 hereinafter.

The phosphor ingredients were mixed by grinding for 15 min in a planetary ball mill and fired in alumina crucible for 2 h at 450° C. followed by a 2 h firing at 750° C. in a reducing nitrogen/hydrogen (95/5 vol. %) atmosphere. The phosphor samples were hand-ground and refired for 2 h at 750° C. in the same atmosphere.

The $Ba_{5-(n+q)}Sr_qSi_{0.4}Ge_{0.6}O_4Br_6:Eu^{2+}{}_n$ phosphors thus formed, wherein n=0.0015, and with q varying as in Table 12, had an X-ray conversion efficiency (C.E.) expressed in pJ/mm2/mR and stimulation energy (S.E.) expressed in μJ/mm2 (for stimulation with 633 nm laser light) as defined in said Table 12.

TABLE 12

| Sample No. | q | C.E. (pJ/mm2/mR) | S.E. (μJ/mm2) |
|---|---|---|---|
| 1 | 0.000 | 1.45 | 30.8 |
| 2 | 0.125 | 2.53 | 30.3 |
| 3 | 0.250 | 2.73 | 30.6 |
| 4 | 0.375 | 2.56 | 29.1 |

EXAMPLE 19

Phosphor preparation proceeded by using 0.02 mole of $(Ba_{0.99925},Eu_{0.00075})CO_3$, 0.004 mole of colloidal $SiO_2$, 0.006 mole of $GeO_2$, and 0.03 mole of a mixture of $BaBr_2$ and $BaCl_2.2H_2O$, the added moles of $BaCl_2.2H_2O$ being variable as can be learned from Table 13 hereinafter.

The phosphor ingredients were mixed by grinding for 15 min in a planetary ball mill and fired in alumina crucible for 2 h at 450° C. followed by a 2 h firing at 750° C. in a reducing nitrogen/hydrogen (95/5 vol. %) atmosphere. The phosphor samples were hand-ground and refired for 2 h at 750° C. in the same atmosphere.

The phosphors thus formed with varying amounts of added $BaCl_2.2H_2O$ had an X-ray conversion efficiency (C.E.) expressed in pJ/mm2/mR and stimulation energy (S.E.) expressed in μJ/mm2 (for stimulation with 633 nm laser light) as defined in said Table 13.

TABLE 13

| Sample No. | Added moles of $BaCl_2.2H_2O$ | C.E. (pJ/mm2/mR) | S.E. (μJ/mm2) |
|---|---|---|---|
| 1 | 0.000 | 1.09 | 40.8 |
| 2 | 0.004 | 1.62 | 58.9 |
| 3 | 0.008 | 2.25 | 60.0 |
| 4 | 0.012 | 2.30 | 61.1 |
| 5 | 0.016 | 1.92 | 79.8 |
| 6 | 0.020 | 1.34 | 110.0 |

EXAMPLE 20

Phosphor preparation proceeded by using 0.02 mole of $(Ba_{0.99925},Eu_{0.00075})CO_3$, 0.004 mole of colloidal $SiO_2$, 0.006 mole of $GeO_2$, 0.026 mole of $BaBr_2$ and 0.004 mole of $BaF_2$.

The phosphor ingredients were mixed by grinding for 15 min in a planetary ball mill and fired in alumina crucible for 2 h at 450° C. followed by a 2 h firing at 750° C. in a reducing nitrogen/hydrogen (95/5 vol. %) atmosphere. The phosphor sample was hand-ground and refired for 2 h at 750° C. in the same atmosphere.

The phosphor thus formed had an X-ray conversion efficiency (C.E.) of 0.79 pJ/mm2/mR and stimulation energy (S E.) of 59.4 μJ/mm2 (for stimulation with 633 nm laser light).

EXAMPLE 21

Phosphor sample 1 preparation proceeded by using 0.02 mole of $(Ba_{0.99925},Eu_{0.00075})CO_3$, 0.004 mole of colloidal $SiO_2$, 0.006 mole of $GeO_2$, and 0.03 mole of $BaBr_2$.

Phosphor sample 2 preparation proceeded by using 0.02 mole of $(Ba_{0.99925},Eu_{0.00075})CO_3$, 0.004 mole of colloidal $SiO_2$, 0.006 mole of $GeO_2$, and 0.025 mole of $BaBr_2$ and 0.005 mole of $BaI_2.2H_2O$.

The phosphor ingredients were mixed by grinding for 15 min in a planetary ball mill and fired in alumina crucible for 2 h at 450° C. followed by a 2 h firing at 800° C. in a reducing nitrogen/hydrogen (95/5 vol. %) atmosphere. The phosphor samples were hand-ground and refired for 2 h at 800° C. in the same atmosphere.

The phosphors thus formed had an X-ray conversion efficiency (C.E.) expressed in pJ/mm2/mR and stimulation energy (S.E.) expressed in μJ/mm2 (for stimulation with 633 nm laser light) as defined in Table 14.

TABLE 14

| Sample No. | C.E. (pJ/mm2/mR) | S.E. (μJ/mm2) |
|---|---|---|
| 1 | 1.02 | 38.4 |
| 2 | 2.04 | 56.6 |

EXAMPLE 22

Phosphor preparation proceeded by using 0.019 mole of $(Ba_{0.99925},Eu_{0.00075})CO_3$, 0.0025 mole of $SrBr_2.6H_2O$, 0.004 mole of colloidal $SiO_2$, 0.006 mole of $GeO_2$, 0.00015 mole of KBr and 0.028325 mole of a mixture of $BaBr_2$ and $BaI_2.2H_2O$ with variable iodide added as can he learned from Table 15 hereinafter.

The phosphor ingredients were mixed by grinding for 15 min in a planetary ball mill and fired in alumina crucible for 2 h at 750° C. in a reducing nitrogen/hydrogen (95/5 vol. %) atmosphere. The phosphor samples were hand-ground and refired for 2 h at 750° C. in the same reducing atmosphere.

The phosphors thus formed had an X-ray conversion efficiency (C.E.) expressed in pJ/mm2/mR and stimulation energy (S.E.) expressed in μJ/mm2 (for stimulation with 633 nm laser light) as defined in said Table 15.

TABLE 15

| Sample No. | Added moles of $BaI_2.2H_2O$ | C.E. (pJ/mm2/mR) | S.E. (μJ/mm2) |
|---|---|---|---|
| 1 | 0.00000 | 2.40 | 38.1 |
| 2 | 0.000927 | 2.79 | 36.0 |
| 3 | 0.001854 | 1.77 | 32.5 |
| 4 | 0.002781 | 1.78 | 32.1 |
| 5 | 0.004635 | 0.96 | 33.5 |

We claim:

1. A method for recording and reproducing an X-ray image comprising the steps of:
   (1) causing a photostimulable phosphor in a binder layer to absorb image-wise or pattern-wise modulated X-rays,
   (2) photostimulating said phosphor with stimulating electromagnetic radiation selected from visible light and infrared light to release from the phosphor in accordance with the absorbed X-rays electromagnetic radiation different in wavelength characteristic from the radiation used in the photostimulation, and
   (3) detecting said light emitted by photostimulation, wherein said phoshor is an alkali earth metal(s) halogermanate or an alkali earth metal(s) halo(silicate-germanate) doped with $Eu^{2+}$ and/or $Ce^{3+}$ and/or thallium, and optionally co-doped with a rare earth metal ion other than $Eu^{2+}$ or $Ce^{3+}$ or with $Na^+$, $K^+$ or $Li^+$ or a mixture of at least two of these co-dopants.

2. A method for recording and reproducing an X-ray image according to claim 1, wherein said phoshor is a halogermanate or halo(silicate-germanate) containing as host metal(s) barium and/or strontium optionally in combination with a minor amount of calcium and/or magnesium; as halogen bromine and/or chlorine optionally in combination with iodine and/or fluorine, and as dopant $Eu^{2+}$ and/or $Ce^{3+}$ and/or thallium, optionally in the presence of at least one co-dopant (D) being a rare earth metal ion other than $Eu^{2+}$ or $Ce^{3+}$ or being $Na^+$, $K^+$ or $Li^+$ or a mixture of at least two of these co-dopants.

3. A method according to claim 2, wherein said phosphor is within the scope of the following empirical formula:

$$Ba_{5-(n+p+q)}Z_qGe_vSi_wO_4X_6:Eu_n^{2+}, D_p^{m+}$$

wherein:
Z is at least one co-host metal selected from the group consisting of strontium, calcium and magnesium,
q is in the range of 0 to 0.5,
v is larger than zero and equals at most 1, and $v+w=1$,
X is bromine and/or chlorine,
n is in the range of 0.0001 to 0.15,
p is in the range of 0 to 0.015,
D is at least one co-dopant selected from the group consisting of $Na^+$, $K^+$ and a rare earth metal ion other than $Eu^{2+}$ or $Ce^{3+}$, and
m is 1 or 3.

4. A method according to claim 2, wherein said phosphor is within the scope of the following empirical formula:

$$Sr_{5-(n+p+q)}Z_qGe_vSi_wO_4X_6:Eu_n^{2+}, D_p^{m+}$$

wherein:
Z is at least one co-host metal selected from the group consisting of barium, calcium and magnesium,
q is in the range of 0 to 0.5,
v is larger than zero and equals at most 1, and $v+w=1$,
X is bromine and/or chlorine,
n is in the range of 0.0001 to 0.15,
p is in the range of 0 to 0.015,
D is at least one co-dopant selected from the group consisting of $Na^+$, $K^+$ and a rare earth metal ion other than $Eu^{2+}$ or $Ce^{3+}$, and
m is 1 or 3.

5. A method according to claim 2, wherein said phosphor is within the scope of one of the following empirical formulae (I) to (IV):

$$Ba_{5-(n+p)}Ge_vSi_wO_4X_6:Eu_n^{2+}, D_p^{m+} \quad (I)$$

$$Ba_{5-(n+p)}Ge_vSi_wO_4X_6:Ce_n^{3+}, D_p^{m+} \quad (II)$$

$$Sr_{5-(n+p)}Ge_vSi_wO_4X_6:Eu_n^{2+}, D_p^{m+} \quad (III)$$

$$Sr_{5-(n+p)}Ge_vSi_wO_4X_6:Ce_n^{3+}, D_p^{m+} \quad (IV)$$

wherein:
X is bromine and/or chlorine,
v is larger than zero and equals at most 1, $v+w$ being 1,
n is in the range of 0.0001 to 0.15,
p is in the range of 0 to 0.015,
D is at least one co-dopant selected from the group consisting of $Na^+$, $K^+$, and a rare earth metal ion other than $Eu^{2+}$ or $Ce^{3+}$, and m is 1 or 3.

6. A method according to claim 5, wherein v is between 0.4 and 0.9.

7. A method according to claim 2, wherein said phosphor is within the scope of one of the following empirical formulae (V) to (VIII):

$$Ba_{5-n}(Ge_vSi_w)O_4X_6:Eu_n^{2+} \quad (V)$$

$$Ba_{5-n}(Ge_vSi_w)O_4X_6:Ce_n^{3+} \quad (VI)$$

$$Sr_{5-n}(Ge_vSi_w)O_4X_6:Eu_n^{2+} \quad (VII)$$

$$Sr_{5-n}(Ge_vSi_w)O_4X_6:Ce_n^{3+} \quad (VIII)$$

wherein X is bromine and/or chlorine, n is in the range from 0.0001 to 0.15, and v is in the range $0 < v \leq 1$, $v+w$ being 1.

8. A method according to claim 1, wherein the photostimulating electromagnetic radiation originates from a laser.

9. A method according to claim 8, wherein the laser is a He-Ne laser.

10. A method according to claim 1, wherein the detection of the light emitted by photo stimulation proceeds with a phototube providing electrical signals that are digitized and stored.

11. A method according to claim 10, wherein said signals are displayed on a cathode-ray tube.

12. A method according to claim 10, wherein the digitized signals are transformed into analog signals that are used to modulate a writing layer beam.

13. A method according to claim 12, wherein the modulated laser beam is used to scan a photographic material.

14. A photostimulable phosphor which is an alkali earth metal(s) halogermanate or an alkali earth metal(s) halo(silicate-germanate) doped with $Eu^{2+}$ and/or $Ce^{3+}$ and/or thallium and optionally co-doped with a rare earth metal ion other than $Eu^{2+}$ or $Ce^{3+}$ or with $Na^+$, $K^+$ or $Li^+$ or a mixture of at least two of these co-dopants.

15. A photostimulable phosphor according to claim 14, wherein said phoshor is a halogermanate or halo(silicate-germanate) containing as host metal(s) barium and/or strontium optionally in combination with a minor amount of calcium and/or magnesium; as halogen bromine and/or chlorine optionally in combination with iodine and/or fluorine, and as dopant $Eu^{2+}$ and/or $Ce^{3+}$ and/or thallium, optionally in the presence of at least one co-dopant (D) being a rare earth metal ion other than $Eu^{2+}$ or $Ce^{3+}$ or being $Na^+$, $K^+$ or $Li^+$ or a mixture of at least two of these co-dopants.

16. A photostimulable phosphor according to claim 15 wherein said phosphor is within the scope of the following empirical formula:

$$Ba_{5-(n+p+q)}Z_qGe_vSi_wO_4X_6:Eu_n^{2+}, D_p^{m+}$$

wherein:
Z is at least one co-host metal selected from the group consisting of strontium, calcium and magnesium,
q is in the range of 0 to 0.5,
v is larger than zero and equals at most 1, and $v+w=1$, X is bromine and/or chlorine,
n is in the range of 0.0001 to 0.15,
D is at least one co-dopant selected from the group consisting of Na$^+$, K$^+$ and a rare earth metal ion other than Eu$^{2+}$ or Ce$^{3+}$,
p is in the range of 0 to 0.015, and
m is 1 or 3.

17. A photostimulable phosphor according to claim 15, wherein said phosphor is within the scope of the following empirical formula:

$$Sr_{5-(n+p+q)}Z_qGe_vSi_wO_4X_6:Eu_n^{2+}, D_p^{m+}$$

wherein:
Z is at least one co-host metal selected from the group consisting of barium, calcium and magnesium,
q is in the range of 0 to 0.5,
v is larger than zero and equals at most 1, and v+w=1,
X is bromine and/or chlorine,
n is in the range of 0.0001 to 0.15,
p is in the range of 0 to 0.015,
D is at least one co-dopant selected from the group consisting of Na$^+$, K$^+$ and a rare earth metal ion other than Eu$^{2+}$ or Ce$^{3+}$, and
m is 1 or 3.

18. A photostimulable phosphor according to claim 15, wherein said phosphor is within the scope of one of the following empirical formulae (I) to (IV):

$$Ba_{5-(n+p)}Ge_vSi_wO_4X_6:Eu_n^{2+}, D_p^{m+} \quad (I)$$

$$Ba_{5-(n+p)}Ge_vSi_wO_4X_6:Ce_n^{3+}, D_p^{m+} \quad (II)$$

$$Sr_{5-(n+p)}Ge_vSi_wO_4X_6:Eu_n^{2+}, D_p^{m+} \quad (III)$$

$$Sr_{5-(n+p)}Ge_vSi_wO_4X_6:Ce_n^{3+}, D_p^{m+} \quad (IV)$$

wherein:
X is bromine and/or chlorine,
v is larger than zero and equals at most 1, v+w being 1,
n is in the range of 0.0001 to 0.15,
p is in the range of 0 to 0.015.
D is at least one co-dopant selected from the group consisting of Na$^+$,
K$^+$ and a rare earth metal ion other than Eu$^{2+}$ or Ce$^{3+}$, and m is 1 or 3.

19. A phosphor according to claim 18, wherein v is between 0.4 and 0.9.

20. A phosphor according to claim 15, wherein said phosphor is within the scope of one of the following empirical formulae (V) to (VIII):

$$Ba_{5-n}(Ge_vSi_w)O_4X_6:Eu_n^{2+} \quad (V)$$

$$Ba_{5-n}(Ge_vSi_w)O_4X_6:Ce_n^{3+} \quad (VI)$$

$$Sr_{5-n}(Ge_vSi_w)O_4X_6:Eu_n^{2+} \quad (VII)$$

$$Sr_{5-n}(Ge_vSi_w)O_4X_6:Ce_n^{3+} \quad (VIII)$$

wherein X is bromine and/or chlorine, n is in the range from 0.0001 to 0.15, and v is in the range 0<v≦1, v+w being 1.

21. A radiation image storage panel comprising in a binder layer a photostimulable phosphor which is an alkali earth metal(s) halogermanate or an alkali earth metal(s) halo(silicate germanate) doped with Eu$^{2+}$ and/or Ce$^{3+}$ and/or thallium, and optionally co-doped with a rare earth metal ion other than Eu$^{2+}$ or Ce$^{3+}$ or with Na$^+$, K$^+$ or Li$^+$ or a mixture of at least two of these co-dopants.

22. A radiation image storage panel according to claim 21, wherein said phoshor is a halogermanate or halo(silicate-germanate) containing as host metal(s) barium and/or strontium optionally in combination with a minor amount of calcium and/or magnesium; as halogen bromine and/or chlorine optionally in combination with iodine and/or fluorine, and as dopant Eu$^{2+}$ and/or Ce$^{3+}$ and/or thallium optionally in the presence of at least one co-dopant (D) being a rare earth metal ion other than Eu$^{2+}$ or Ce$^{3+}$ or being Na$^+$, K$^+$ or Li$^+$ or a mixture of at least two of these co-dopants.

23. A radiation image storage panel according to claim 22, wherein said phosphor is within the scope of the following empirical formula:

$$Ba_{5-(n+p+q)}Z_qGe_vSi_wO_4X_6:Eu_n^{2+}, D_p^{m+}$$

wherein:
Z is at least one co-host metal selected from the group consisting of strontium, calcium and magnesium.
q is in the range of 0 to 0.5,
v is larger than zero and equals at most 1, and v+w=1,
X is bromine and/or chlorine,
n is in the range of 0.0001 to 0.15,
D is at least one co-dopant selected from the group consisting of Na$^+$, K$^+$ and a rare earth metal ion other than Eu$^{2+}$ or Ce$^{3+}$,
p is in the range of 0 to 0.015 and
m is 1 or 3.

24. A radiation image storage panel according to claim 22, wherein said phosphor is within the scope of the following empirical formula:

$$Sr_{5-(n+p+q)}Z_qGe_vSi_wO_4X_6:Eu_n^{2+}, D_p^{m+}$$

wherein:
Z is at least one co-host metal selected from the group consisting of barium, calcium and magnesium,
q is in the range of 0 to 0.5,
v is larger than zero and equals at most 1, and v+w=1,
X is bromine and/or chlorine,
n is in the range of 0.0001 to 0.15,
p is in the range of 0 to 0 015,
D is at least one co-dopant selected from the group consisting of Na$^+$, K$^+$ and a rare earth metal ion other than Eu$^{2+}$ or Ce$^{3+}$, and
m is 1 or 3.

25. A radiation image storage panel according to claim 22, wherein said phosphor is within the scope of one of the following empirical formulae (I) to (IV):

$$Ba_{5-(n+p)}Ge_vSi_wO_4X_6:Eu_n^{2+}, D_p^{m+} \quad (I)$$

$$Ba_{5-(n+p)}Ge_vSi_wO_4X_6:Ce_n^{3+}, D_p^{m+} \quad (II)$$

$$Sr_{5-(n+p)}Ge_vSi_wO_4X_6:Eu_n^{2+}, D_p^{m+} \quad (III)$$

$$Sr_{5-(n+p)}Ge_vSi_wO_4X_6:Ce_n^{3+}, D_p^{m+} \quad (IV)$$

wherein:
X is bromine and/or chlorine,
v is larger than zero and equals at most 1, v+w being 1,
n is in the range of 0.0001 to 0.15, p is in the range of 0 to 0.015, D is at least one co-dopant selected from the group consisting of Na$^+$, K$^+$, and a rare earth metal ion other than Eu$^{2+}$ or Ce$^{3+}$, and m is 1 or 3.

26. A radiation image storage panel according to claim 25, wherein v is between 0.4 and 0.9.

27. A radiation image storage panel according to claim 22, wherein said phosphor is within the scope of one of the following empirical formulae (V) to (VIII):

$$Ba_{5-n}(Ge_vSi_w)O_4X_6:Eu_n^{2+} \quad (V)$$

$$Ba_{5-n}(Ge_vSi_w)O_4X_6:Ce_n^{3+} \quad (VI)$$

$$Sr_{5-n}(Ge_vSi_w)O_4X_6:Eu_n^{2+} \quad (VII)$$

$$Sr_{5-n}(Ge_vSi_w)O_4X_6:Ce_n^{3+} \quad (VIII)$$

wherein X is bromine and/or chlorine, n is in the range from 0.0001 to 0.15, and v is in the range $0 < v \leq 1$, $v+w$ being 1.

28. A radiation image storage panel according to claim 21 wherein said binder layer is supported by a support sheet.

* * * * *